Patented July 21, 1931

1,815,519

UNITED STATES PATENT OFFICE

CHARLES MAGAT, OF PARIS, FRANCE

ALIMENTARY SUBSTANCE AND ITS MANUFACTURE

No Drawing. Application filed August 5, 1929, Serial No. 383,782, and in Great Britain September 28, 1928.

This invention relates to a process for the manufacture of an alimentary substance.

According to this invention an alimentary nutritive substance is prepared by mixing together intimately, melted vegetable fat, such as cocoa-butter, and chocolate and cooling the mass so obtained quickly by contact with ice so that a product is obtained which under the action of the salivary juices produces a sensation of cold when consumed.

An example of how the invention may be carried into effect is given below.

First of all I prepare a chocolate whose composition is as follows:—

|  | Per cent |
|---|---|
| Cocoa | 45 |
| Sugar | 15 |
| Cocoa-butter | 2 |
| Fecula | 38 |

The percentage of fecula may be modified, the total of the three constitutents, sugar, cocoa butter and fecula, being variable between the limits of 45% to 55% of the mixture with the cocoa. The quantity of vegetable fat (e. g. cocoa-butter) is variable according to the prevailing temperature, the proportion being increased for low temperatures. For example, in summer, I add 13,2 lbs. of fat to 11 lbs. of chocolate, while in winter the quantity of fat will be increased to 15,4 lbs.

The whole is then made aromatic with any desired flavoring, e. g. vanilla, coffee, etc.

To obtain the alimentary substance from the constituents mentioned above, I begin by melting the vegetable fat on a water-bath taking care that the temperature does not exceed 86° F. The chocolate, made up as indicated above, is ground and is cooked in the fat until an intimate mixture without lumps is obtained. Thereafter I allow the temperature to decrease to about 68° F. and add the flavoring. The mixture is cast into moulds and quickly cooled by means of ice so as to congeal the fats.

This substance, which can be stored indefinitely provided it is away from heat and dampness, has the property, in contact with salivary juices of giving rise to a feeling of cold when placed in the mouth. It therefore forms an article of confectionery which is agreeable to the taste and a product of nutritive value.

It has been proposed to prepare a fatty compound of chocolate by partially manufacturing the chocolate, one half of the sugar ultimately required being kept out, mixing the sugar kept out with a fatty material, and then mixing these two products together at a temperature not high enough to melt the fatty material.

It has also been proposed to manufacture chocolate by reducing the various ingredients, which may include cocoa-butter or any other fat, to a liquid form and atomizing th se together in a particular atmosphere whereby a fine powder of dry chocolate substance is obtained, the particles being coated with cocoa-butter or other fat, from which cake chocolate can be made.

Having now particularly described and ascertained the nature of my said invention and in what manner the same is to be performed, I declare that what I claim is:

A method of making an edible chocolate product consisting in melting a vegetable fat at a temperature not exceeding 86° F., cooking finely ground chocolate in the fat until an intimate mixture is obtained, decreasing the cooking temperature to 68° F., adding the flavoring, casting the mixture into molds, and quickly cooling the mixture by means of ice.

In testimony whereof I affix my signature.

CHARLES MAGAT.